US009827992B2

(12) United States Patent
Prakah-Asante et al.

(10) Patent No.: US 9,827,992 B2
(45) Date of Patent: Nov. 28, 2017

(54) DRIVER ANOMALY DETECTION (71) Applicant: Ford Global Technologies, LLC, Dearborn, MI (US)

(72) Inventors: Kwaku O. Prakah-Asante, Commerce Township, MI (US); Hsin-hsiang Yang, Ann Arbor, MI (US); Finn Tseng, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 497 days.

(21) Appl. No.: 14/219,335

(22) Filed: Mar. 19, 2014

(65) Prior Publication Data

US 2015/0266485 A1 Sep. 24, 2015

(51) Int. Cl.
*B60W 40/09* (2012.01)
*B60W 40/114* (2012.01)
*B60W 40/08* (2012.01)

(52) U.S. Cl.
CPC ............ *B60W 40/09* (2013.01); *B60W 40/08* (2013.01); *B60W 40/114* (2013.01); *B60W 2040/0827* (2013.01); *B60W 2520/10* (2013.01); *B60W 2520/14* (2013.01); *B60W 2540/18* (2013.01)

(58) Field of Classification Search
CPC .................................. G08G 1/165; B60Q 5/005
USPC .......................................................... 701/1
See application file for complete search history.

(56) References Cited

U.S. PATENT DOCUMENTS

| | | | |
|---|---|---|---|
| 4,581,607 A | 4/1986 | Seko et al. | |
| 4,594,583 A | 6/1986 | Seko et al. | |
| 4,604,611 A | 8/1986 | Seko et al. | |
| 5,850,193 A | 12/1998 | Shimoura et al. | |
| 7,019,653 B2 * | 3/2006 | Benedict | 340/576 |
| 7,529,290 B2 * | 5/2009 | Hiromori | 375/148 |
| 7,649,445 B2 * | 1/2010 | Kuramori et al. | 340/439 |
| 8,175,772 B2 * | 5/2012 | Onuma | 701/41 |
| 8,396,630 B2 | 3/2013 | Barnett | |
| 8,519,853 B2 | 8/2013 | Eskandarian et al. | |
| 2010/0033333 A1 * | 2/2010 | Victor et al. | 340/576 |
| 2010/0109881 A1 * | 5/2010 | Eskandarian et al. | 340/575 |
| 2010/0152974 A1 * | 6/2010 | Barnett | 701/42 |

OTHER PUBLICATIONS

Driver Assistance Systems, Bosch Automotive Technology, http://bosch-automotivetechnology.com/en/de/driving_safety/driving_safety_systems_for_ . . . .

* cited by examiner

*Primary Examiner* — Adam Tissot
*Assistant Examiner* — Michael Berns
(74) *Attorney, Agent, or Firm* — Frank A. MacKenzie; Bejin Bieneman PLC

(57) ABSTRACT

Vehicle trajectory data is obtained. A variance of the trajectory data is recursively determined. A speed-dependent weighting function is computed to obtain a speed-dependent weight. An anomaly index is determined based at least on part on application of the speed dependent weight to the recursively determined variance.

18 Claims, 10 Drawing Sheets

Example of obtaining anomaly index

Frequency responses for modified high-pass filter

FIG. 10

DRIVER ANOMALY DETECTION

BACKGROUND

Current mechanisms for detecting a vehicle driver's state based on a driver's control activity or activities, e.g., commands for acceleration, braking, and steering, suffer from certain shortcomings. For example, steering anomalies may warrant attention because certain patterns or activities may indicate a high driving demand condition or unsafe driver condition, such as fatigue or drowsiness. However, present mechanisms may not account for different driver states that may be reflected by driver steering activities detected at different frequencies.

DETAILED DESCRIPTION

System Overview

Figure 1:
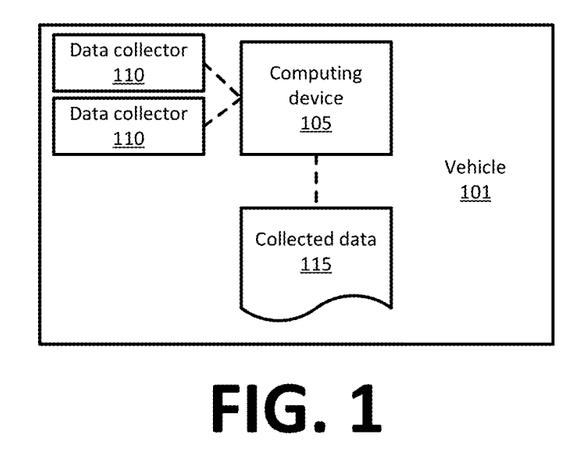
FIG. 1 is a block diagram of a vehicle system for detecting driver anomalies.

FIG. 1 is a block diagram of a vehicle 101 system for detecting anomalous driver behavior, e.g., that may indicate a dangerous driving condition such as drowsiness. The vehicle 101 includes a computing device 105 that is communicatively coupled to one or more data collectors 110, e.g., sensors or the like such as are known for collecting data 115 relating to steering angles, speed, and yaw rates of the vehicle 101, and/or other data as discussed herein. The computer 105 is further configured to use the foregoing data 115, in particular data relating to vehicle 101 trajectory such as steering angle data 115 and/or yaw-rate data 115, generally in conjunction with velocity data 115, for determining a potential or likely anomalous driving condition, e.g., likely high driving demand condition, and driver fatigue or drowsiness, etc.

Mechanisms for determining an anomalous driver condition are described in more detail below; in general, trajectory data 115 is collected. For example, in one implementation, steering angle data 115 is collected, and a speed-dependent weighting function is applied to the vehicle 101 steering angle. A recursive variance of the weighted steering angle is calculated to obtain a first anomaly index. A second anomaly index associated with a specific frequency component in steering behavior is also calculated. A band-pass filter is applied to the weighted steering angle and a recursive variance of the band-passed weighted steering angle is calculated to obtain a second anomaly index. Where one or both of the anomaly indexes exceed predetermined thresholds, anomalous driving conditions may be detected.

A similar technique may be applied with respect to vehicle 101 yaw rates. For example, yaw-rate data 115 may be band-passed, whereupon a variance of the band-passed yaw rate may be calculated, and used to indicate a possible anomalous behavior, e.g., possible driver drowsiness, when the band-passed yaw rate exceeds a predetermined threshold.

The computer 105 may further be configured to take action, e.g., provide an alert or the like and/or execute some control of the vehicle 101, e.g., slowing or stopping the vehicle 101, upon a determination that an anomalous driver condition such as driver drowsiness has been detected. Accordingly, driver drowsiness may be quantified and identified using sensors or other data collectors 110 generally already disposed in a vehicle 101, and without additional road information that would require additional data 115 and/or sensors 110.

Exemplary System Elements

The vehicle 101 is generally a land-based vehicle traveling on two or more wheels, e.g., a four-wheeled passenger automobile or the like. A central computer 105, e.g., included in the vehicle 101, generally includes a processor and a memory, the memory including one or more forms of computer-readable media, generally including volatile and non-volatile memory, and storing instructions executable by the processor for performing various operations, including as disclosed herein. The memory of the computer 105 further generally stores instructions, executable by the processor of the computer 105, for carrying out processes disclosed herein, e.g., receiving and evaluating data 115 from data collectors 110, making determinations with respect to driver drowsiness, etc.

The computer 105 is generally configured for communications on a controller area network (CAN) bus or the like. In addition, the computer 105 may be configured for communicating with one or more devices 150, e.g., via various wired and/or wireless networking technologies, such as Bluetooth, a universal serial bus (USB) or micro-USB cable, etc. Further, the computer 105 may include, or may be coupled to, a human machine interface (HMI), that's may receive input provided to the computer 105, and display output. An HMI may include a variety of mechanisms, e.g., an input device such as a touchscreen, keyboard, keypad, microphone, etc., and further generally includes output mechanisms such as a display screen, speakers, etc.

Data collectors 110 may include a variety of devices, including sensors or the like, e.g., using gyroscopes, generally deployed in existing vehicles 101 for detecting a yaw rate and/or other data 115. Further, various controllers in a vehicle may operate as data collectors 110 to provide data 115 via the CAN bus, e.g., data 115 relating to vehicle speed, acceleration, etc. Yet further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms to detect a position, change in position, rate of change in position, etc., of vehicle 101 components such as a steering wheel, brake pedal, accelerator, gearshift lever, etc.

A memory of the computer 105 generally stores collected data 115. Collected data 115 may include a variety of data collected in a vehicle 101. Examples of collected data 115 are provided above, and moreover, data 115 is generally collected using one or more data collectors 110, and may additionally include data calculated therefrom in the computer 105.

Exemplary Process Flows

Figure 2:
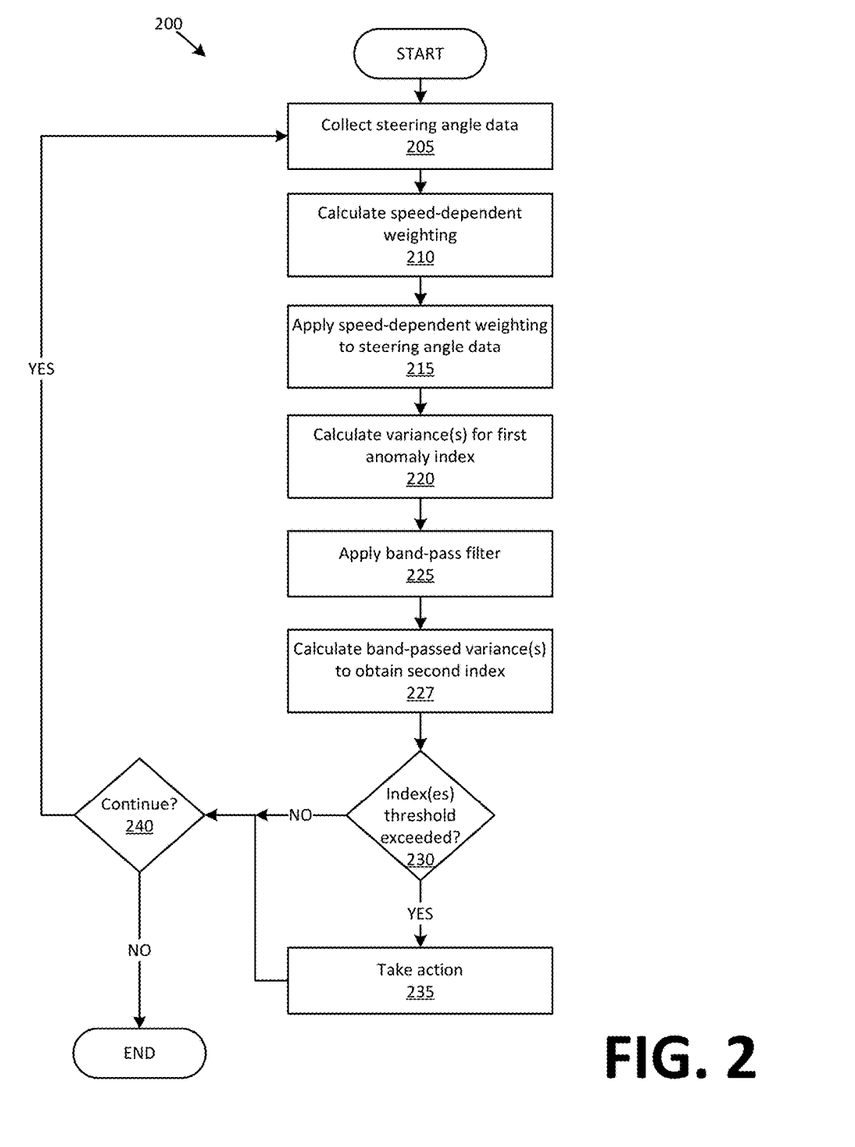
FIG. 2 is a diagram of an exemplary process for detecting driver anomalies.

FIG. 2 is a diagram of an exemplary process 200 for detecting an anomalous driving condition, e.g. to detect a dangerous driving condition. In general the process 200 includes a determination of a band-passed anomaly index using a recursive variance of band-passed weighted steering angles to provide useful information concerning a possible dangerous driving condition.

The process 200 begins in a block 205, in which a vehicle 101 computer 105 collects data 115 including a steering angle of the vehicle 101 for a period of time, e.g., the past 10 seconds, the past 20 seconds, the past 30 seconds, etc.

Next, in a block 210, the computer 105 computes a speed-dependent weighting function, an example of which is shown in Equation 1 below, to obtain a weight G, also referred to as a yaw-rate gain, that can be applied to steering angle data 115. In Equation 1, L represents the vehicle 101 wheel base, $K_{us}$ is an under-steer coefficient, and v is vehicle 101 longitudinal speed.

$$G_{yawrate} = \frac{v}{L + K_{us} \cdot \frac{v^2}{g}} \quad \text{Equation 1}$$

Figure 3:
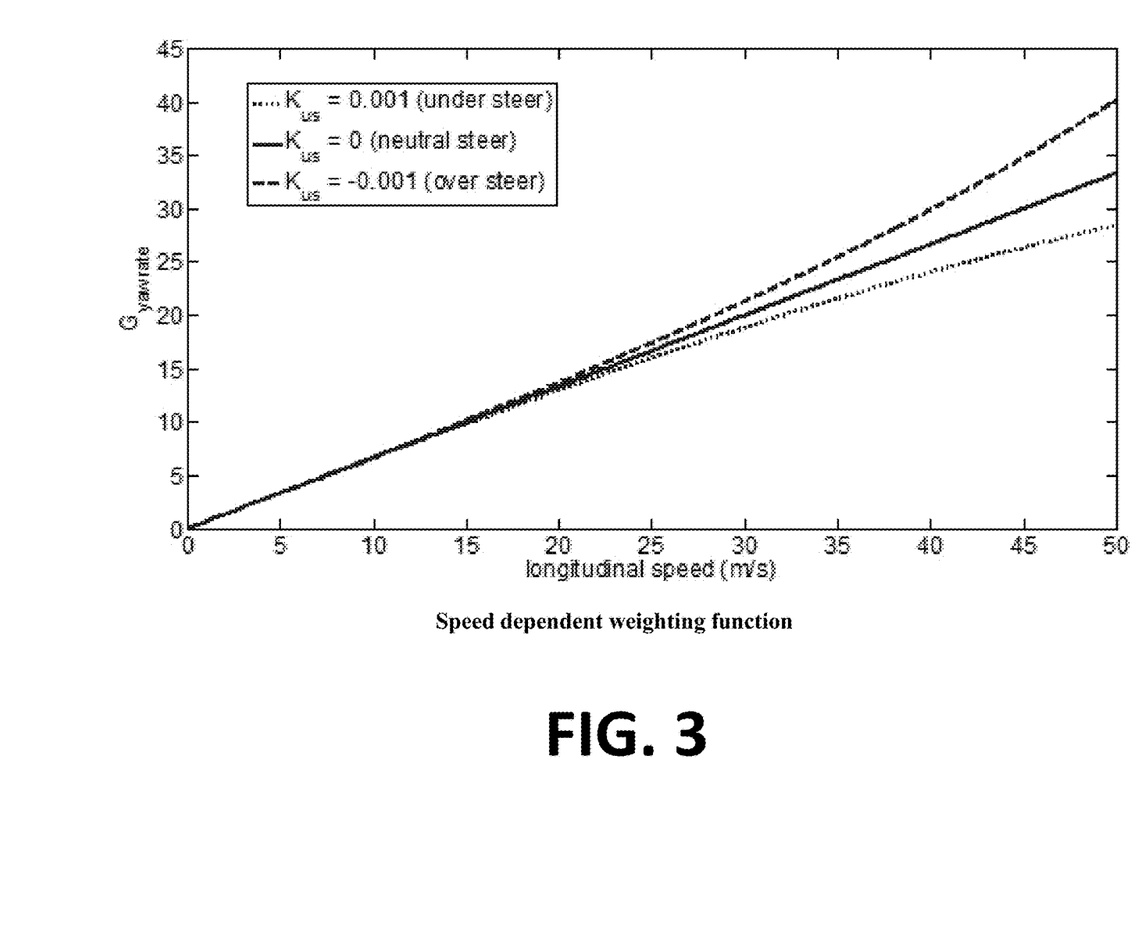
FIG. 3 illustrates an exemplary graph showing a relationship between yaw-rate gain and vehicle longitudinal speed.

In general, the yaw-rate gain G increases with vehicle 101 speed. For example FIG. 3 illustrates an exemplary graph showing that the yaw-rate gain is linear to the vehicle 101 longitudinal speed for a neutral-steer vehicle ($K_{us}$=0), diverging depending on a value of the under-steer coefficient.

Next, in a block 215, the weighting function of the block 210 is applied to, e.g., multiplied by, the values of steering angle data collected in block 205. Applying the weighting function G to steering angle values allows for further distinctions and classifications.

Following the block 215, next, in a block 220, a weighted steering angle variance is recursively calculated, e.g., according to Equations 2a, 2b, and 2c:

Equations $$\Delta x_k = x_k - \bar{x}_k \quad (2a)$$

$$\bar{x}_{k+1} = (1-\alpha) \cdot \bar{x}_k + \alpha \cdot x_k \quad (2b)$$

$$Var_{k+1} = (1-\alpha) \cdot (Var_k + \alpha \cdot \Delta x_k^2) \quad (2c)$$

In the above Equations 2, x is a driver control action, e.g., a weighted steering angle, $\bar{x}$ is a mean value for the driver control action, Var is the variance, and a is a forgetting factor. The variance Var represents an absolute variability of the weighted steering angle. Accordingly, various steering activities may be classified by an index, e.g., large abrupt steering such as turning at low speeds, small steering angle variations in a high-speed lane change, etc.

Figure 4:
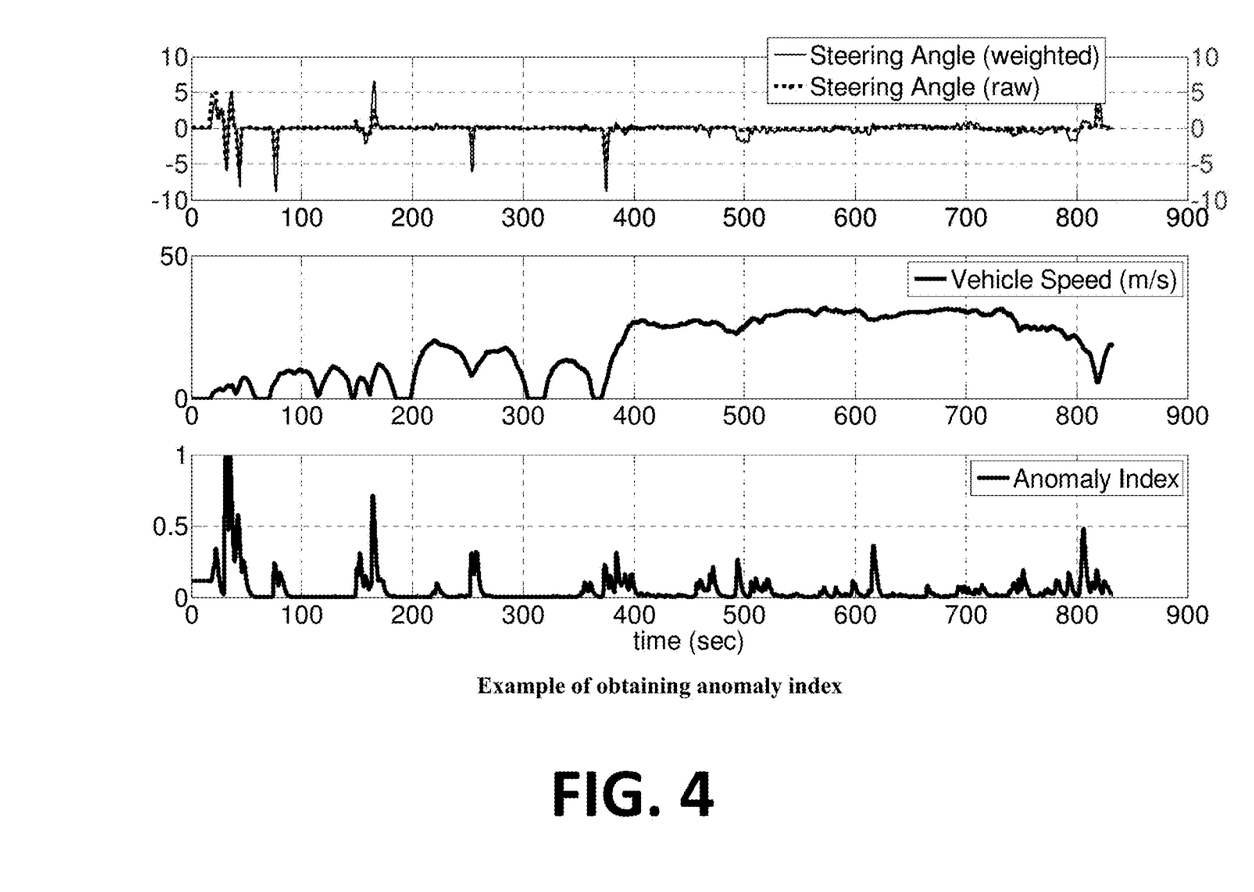
FIG. 4 illustrates exemplary graphs of data from a vehicle test run relating to an anomaly index.

An illustration is provided in FIG. 4, which provides graphs illustrating a vehicle 101 test run. A top graph illustrates a graph of values of raw and weighted steering angle data 115; a middle graph illustrates vehicle 101 speed data 115, and a bottom graph shows corresponding computed values for an anomaly index. In general, it has been found that the anomaly index computed with weighted steering angle variances provides a richer and more useful data set than would otherwise be obtained, especially for higher speed ranges. Accordingly, various activities and/or events may be indexed to various values. For example, lane change maneuvers generally have been found to have index values around 0.2-0.4. Other maneuvers, e.g., road curve negotiation, lane centering, etc., may likewise be indexed with various values.

Variances Var obtained in the block 220 comprise a first anomaly index that may be computed as part of the process 200. The first anomaly index is designed to detect anomalous driving conditions related to high-workload conditions such as turning, changing lanes, negotiating curves, etc., i.e., scenarios for which significant steering occurs.

Next, in a block 225, a band-pass filter, an exemplary illustration of which is provided in Equations 3a and 3b below is applied to the weighted steering angle data computed in the block 215. The band-pass filter is generally useful because, in addition to lower frequency control activities for various driving tasks, e.g., turning, lateral control of a vehicle 101 also includes higher frequency steering activities, e.g., error correction and disturbance rejection. A specialized band-pass filter, e.g., as shown in Equation 3a and 3b, has been developed to exclude such routine and desirable behaviors from the weighted steering angle.

$$\begin{cases} y_i = \alpha_{lp} \cdot y_{i-1} + (1 - \alpha_{lp})x_i \\ \dot{y}_i = y_{i-n} - (\alpha_{hp} \cdot \dot{y}_{i-1} + (1 - \alpha_{hp})y_i) \end{cases} \quad \text{Equations 3a and 3b}$$

$$\text{where } n = \frac{\tau_{hp}}{\Delta t}$$

This band-pass filter is a cascade combination of a low-pass filter (Equation 3a) having steering angle variance inputs ($x_i$) with a time constant ($\alpha_{lp}$), and a high-pass filter (Equation 3b) with the time constant ($\alpha_{hp}$), the high-pass filter taking as input the output form the low-pass filter ($y_i$) although this input is advantageously modified. In particular, instead of using current input $y_i$, an $n^{th}$-step delay input $y_{i-n}$ may be used. Values for variables used in the Equations 3 may be empirically determined. Application of the band-pass filter results in a set of band-passed steering angle data ($\dot{y}_i$).

Figure 5:
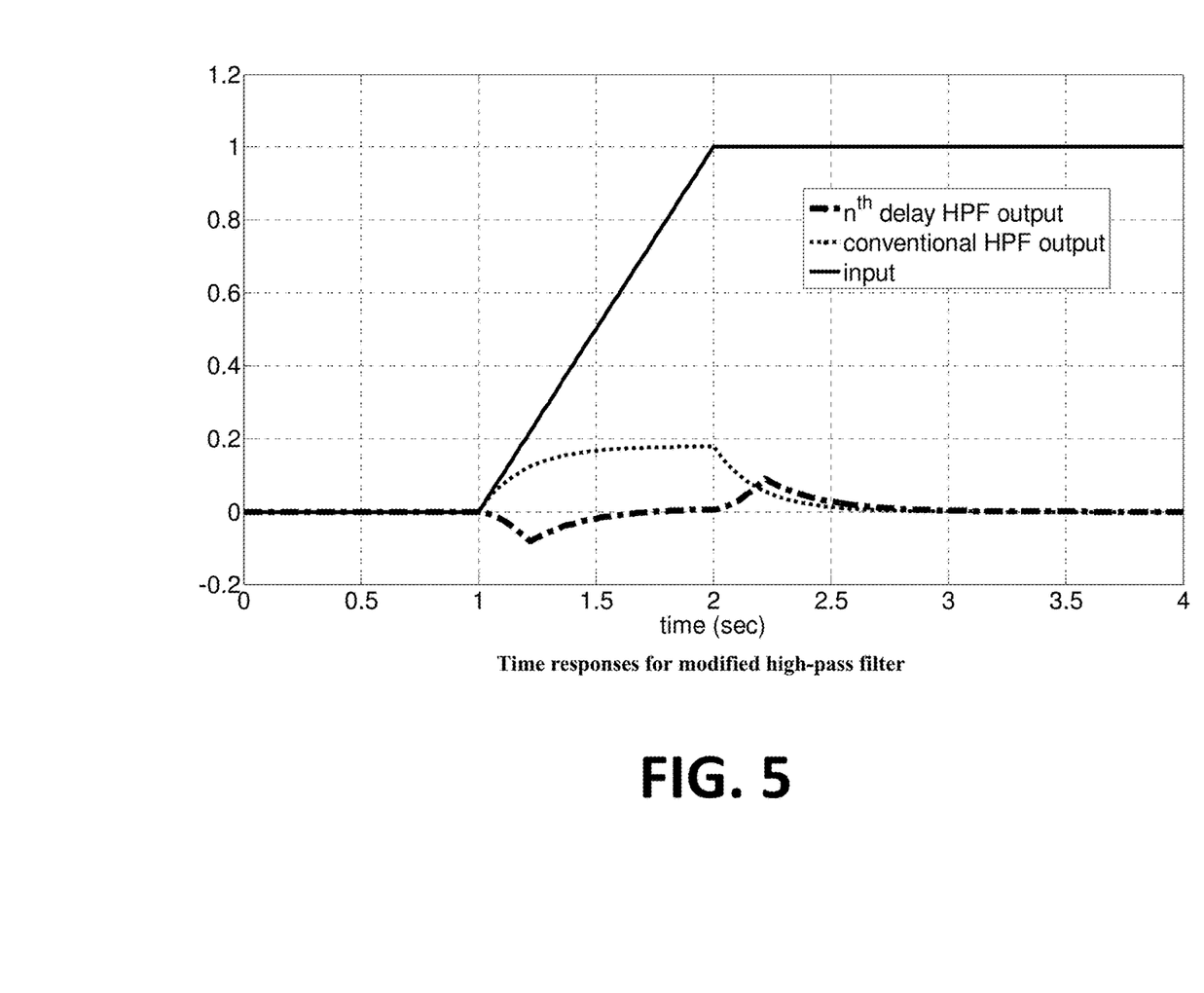
FIG. 5 illustrates an exemplary graph of time responses from a modified high-pass filter.
Figure 6:
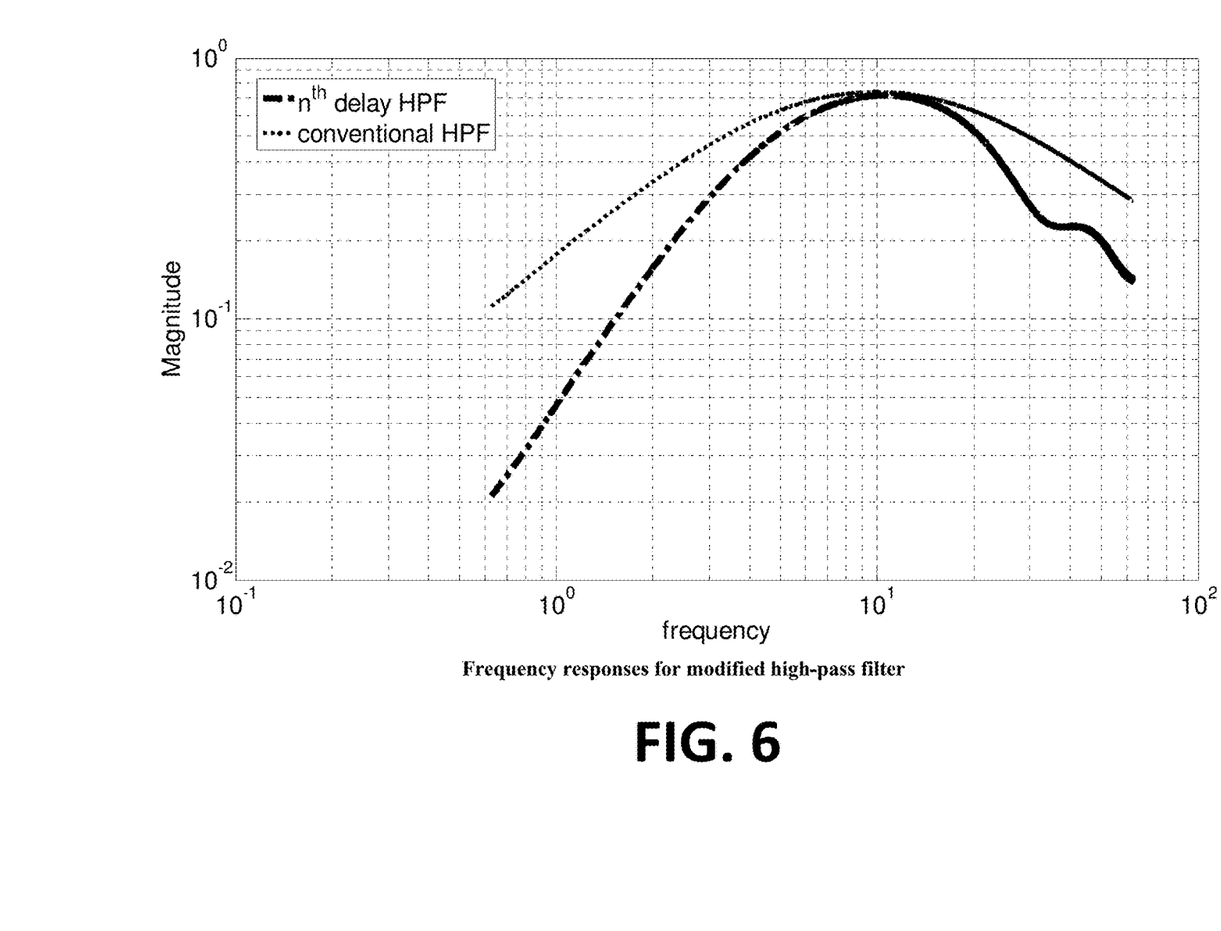
FIG. 6 illustrates an exemplary graph of frequency responses from a modified high-pass filter.

Time responses from a typical steering input are shown in FIG. 5. Frequency responses are shown in FIG. 6. (Note that in the figures, the label "HPF" stands for "high pass filter.") As illustrated by the graphs in FIG. 5, it has been found that the modified $n^{th}$-step delay high-pass filter responds to transitions of the input signal ($y_{i-n}$) rather than providing a signal that remains as high as the current high-pass filter. In FIG. 6, it can be seen that the modified high-pass filter has sharper slope after cutoff.

Next, in a block 227, band-passed variances are recursively calculated, e.g., Equations 2 are applied using the band-pass filter outputs ($\dot{y}_i$) as the driver control input x to Equations 2. Accordingly, an additional or alternative second anomaly index is thereby obtained.

Figure 10:
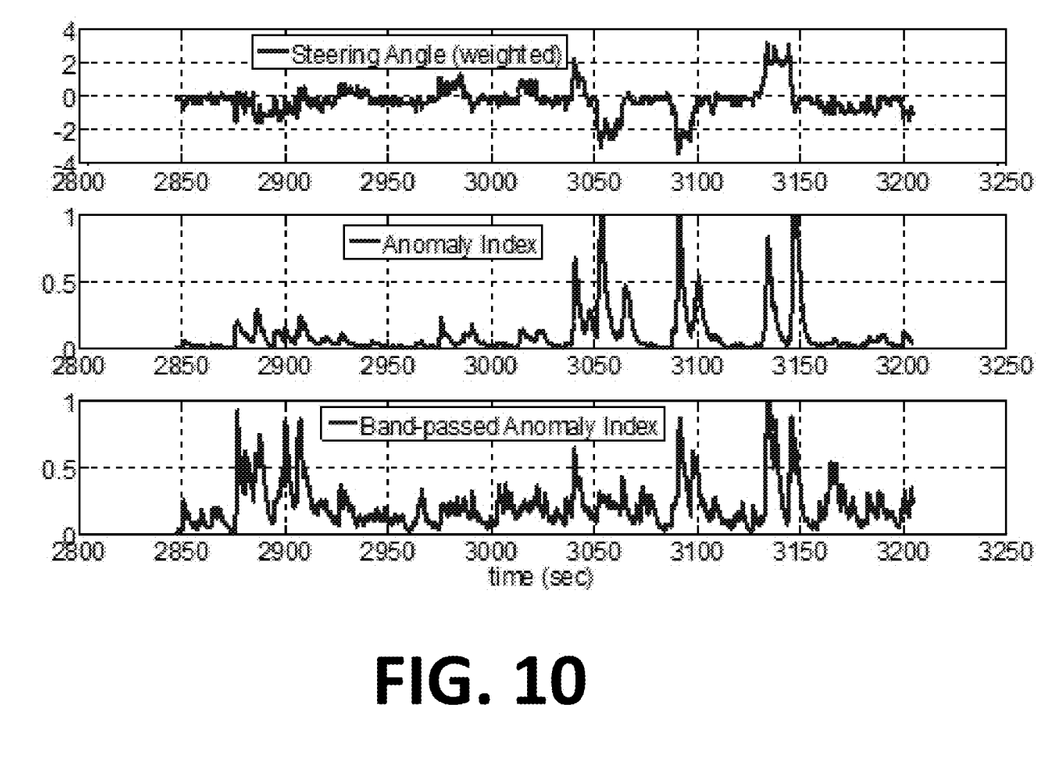
FIG. 10 provides an exemplary graph of weighted steering angle data, and first and second anomaly indexes, from actual highway driving.

FIG. 10 provides an exemplary graph of weighted steering angle data and first (non-band-passed) and second (band-passed) anomaly indexes from an actual highway driving test. As can be seen the band-passed data exhibits greater sensitivity, and thus is appropriate for detecting events where steering angle changes may be less significant, e.g., high speed lane changes or the like, compared to events detectable with the non-band-passed anomaly index, e.g., low-speed turns. For example, a video associated with the test that generated the FIG. 10 data shows that the subject vehicle experienced high traffic disruption from an adjacent lane at time indexes 2875-2925 second. This perturbed behavior is not clear from the first anomaly index, but shows up in the second, band-passed anomaly index.

Following the block 227, next, in a block 230, the computer 105 determines whether a first anomaly index (discussed with respect to the block 220) and/or a second anomaly index (discussed with respect to the block 225, e.g., one or more of the band-passed steering angle variances ($\hat{y}_i$)), exceed a predetermined threshold for the anomaly index. The predetermined threshold, whether for the non-band-passed anomaly index or a band-passed anomaly index, is generally determined through empirical testing and a calibration dependent on an anomalous driving scenario, e.g., high driving demand condition, detection of drowsiness, intoxication, etc. If one or both indexes do exceed a predetermined threshold, then a block 235 is executed next. Otherwise, the process 200 proceeds to a block 740.

In the block 235, which may follow the block 230, the computer 105 identifies an anomalous driving condition, e.g., a high driving demand condition or a drowsiness condition, and generally takes an action based thereon. For example, the computer 105 could raise one or more alerts via an HMI, e.g., an audio alert providing a noise or message to the vehicle 101 driver, a visual alert on a screen of the HMI, etc. Further, the computer 105 could be configured to send instructions to one or more controllers in the vehicle 101, e.g., to adjust a speed of the vehicle 101, to steer the vehicle 101 to a safe stop, etc. Following the block 235, the process 200 proceeds to the block 240.

In the block 240, which may follow any of the blocks 230, 235, the computer 105 determines whether the process 200 should continue. For example, the vehicle 101 could be powered off, stopped, or moving at a velocity insufficient for meaningful steering angle data 115 to be gathered. Accordingly, the process 200 may end following the block 240. However, the process 200 may also continue by returning to the block 205.

Note that presently described mechanisms could be used to identify various anomalous driving conditions, e.g., drowsiness, a driver who was impaired because of a medical condition, drugs or alcohol, etc. However, for impairments other than drowsiness, values of variables in the above analysis could be different.

Figure 8A:
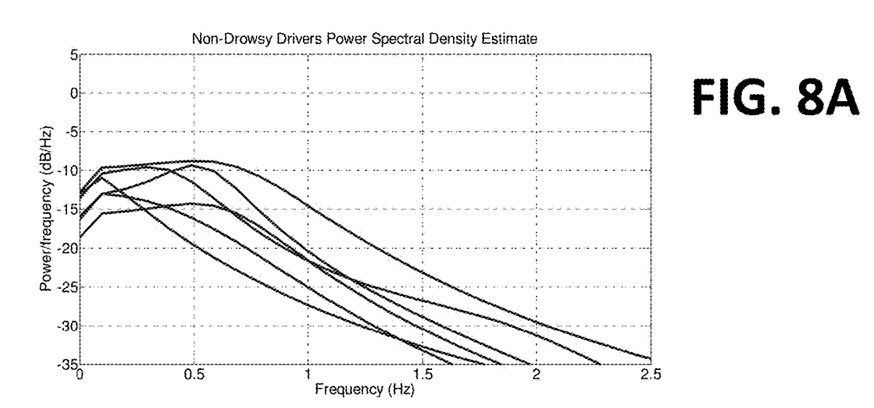
FIG. 8A provides an exemplary graph of a power spectral density analysis of yaw-rate variances for a non-drowsy driver, and FIG. 8B provides an exemplary graphical power spectral density analysis of yaw-rate variances.
Figure 8B:
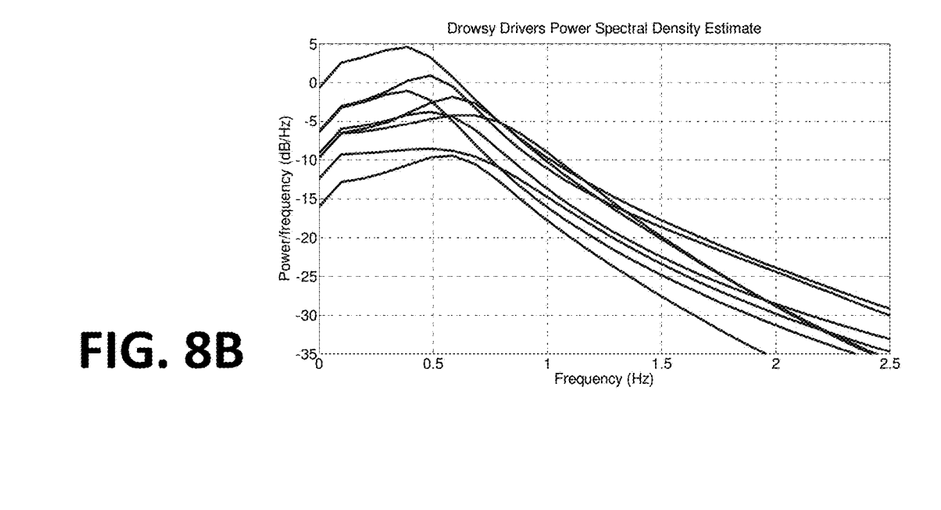

Further, the process 200 may be modified to use yaw-rate data 115 instead of steering angle data 115. For example, it has been observed that driver drowsiness is a behavior that has certain specific frequency components. A drowsiness condition can be identified from a power spectral density (PSD) analysis. Power spectral density analyses illustrate the effects of the drowsiness on yaw-rate data 115. For example, FIG. 8A provides an exemplary graph of a power spectral density analysis of yaw-rate variances for a non-drowsy driver, and FIG. 8B provides an exemplary graphical power spectral density analysis of yaw-rate variances from the ideal determined by a reference model for a drowsy driver. Significant frequency components associated with driver drowsiness can be seen around 0.5 Hz.

Figure 7:
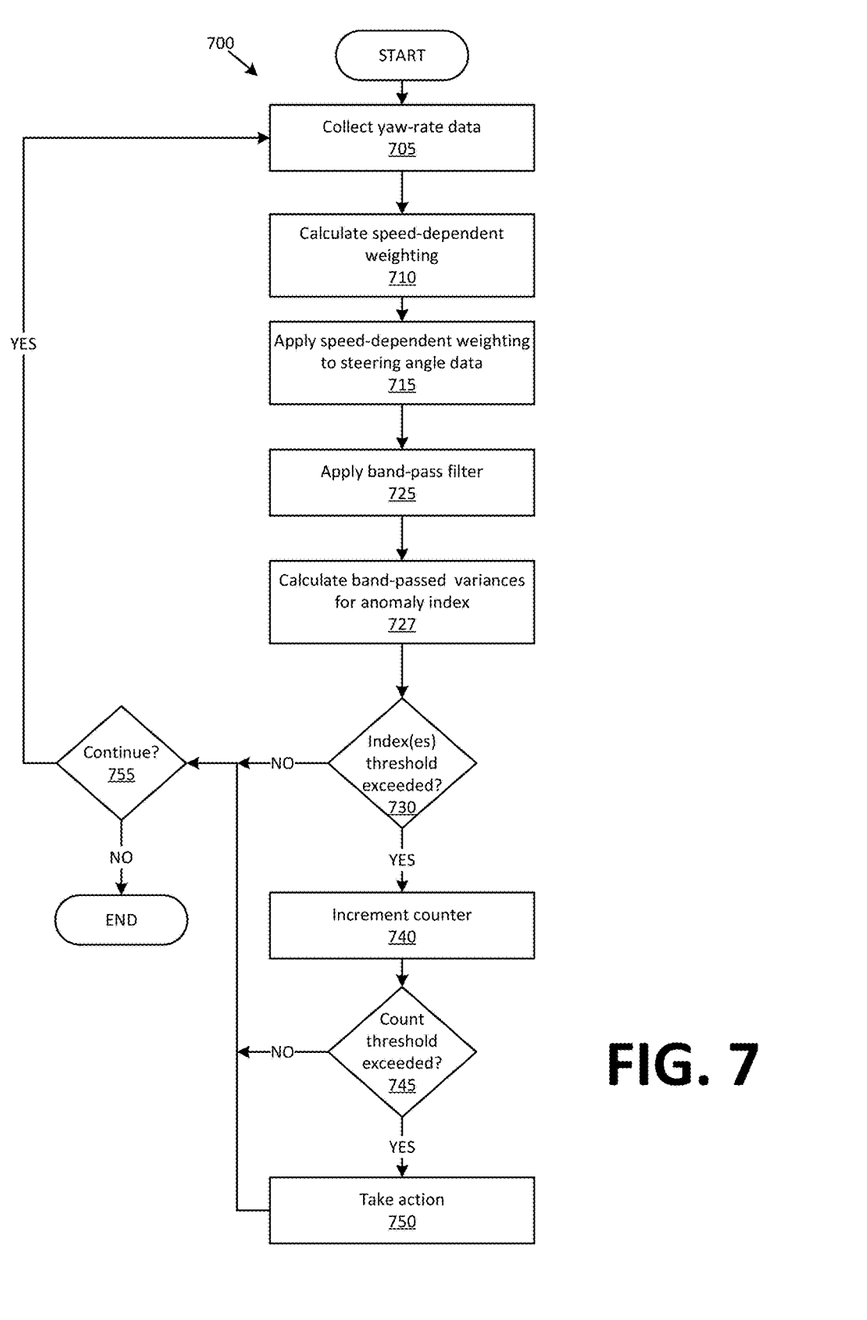
FIG. 7 is a diagram of an alternative or additional exemplary process for detecting an anomalous driving condition, e.g. to detect a drowsy driving condition.

Accordingly, FIG. 7 is a diagram of an alternative or additional exemplary process 700 for detecting an anomalous driving condition, e.g. to detect a drowsy driving condition. yaw-rate data may be gathered in the block 705 of the process 700 in a manner similar to the collection of data 115 in the block 205. In blocks 710, 715 the speed dependent weighting function may be calculated and applied as described in the blocks 210, 215, and variances of band-passed yaw-rate may be calculated in blocks 725 and 777, as described with respect to the blocks 215, 225, and 227. (Note that the process 700 omits a step analogous to the block 220; only one anomaly index is calculated in the process 700.)

Continuing to the block 730, following the block 725, a determination is made whether the band-passed yaw-rate variance is above a predetermined threshold, thus indicating possible drowsy behavior. The predetermined threshold is generally determined through empirical testing and a calibration dependent on a vehicle platform. If the variance does exceed the predetermined variance threshold, then a block 740 is executed next. Otherwise, the process 700 proceeds to a block 755.

In the block 740, which may follow the block 735, the computer 105 increments a counter that is an integer data type generally initially set (or re-set) to zero, and that is used to record a number of times a variance threshold has been exceeded since the counter was set or re-set. For example, in the presently-described implementation, the counter records a number of time periods t for which the variance threshold has been exceeded. After a predetermined period of time, e.g., in one implementation, six minutes, the counter is re-set.

Following the block 740, in a block 745, the computer 105 determines whether the counter incremented in the block 740 exceeds a predetermined threshold. As with the predetermined index threshold of the block 730, described above, the counter threshold of the block 740 may be determined by empirical testing and a calibration dependent on a vehicle platform. If the counter threshold is exceeded, then a block 750 is executed next. Otherwise, the process 700 proceeds to the block 755.

In the block 750, which may follow the block 745, the computer 105 identifies a dangerous driving condition, e.g., a drowsiness condition and generally takes an action based thereon. For example, the computer 105 could raise one or more alerts via an HMI, e.g., an audio alert providing a noise or message to the vehicle 101 driver, a visual alert on a screen of the HMI, etc. Further, the computer 105 could be configured to send instructions to one or more controllers in the vehicle 101, e.g., to adjust a speed of the vehicle 101, to steer the vehicle 101 to a safe stop, etc. Following the block 755, the process 700 proceeds to the block 755.

In the block 755, which may follow any of the blocks 730, 745, 750, the computer 105 determines whether the process 700 should continue. For example, the vehicle 101 could be powered off, stopped, or moving at a velocity insufficient for meaningful yaw-rate data to be gathered. Accordingly, the process 700 may end following the block 755. However, the process 700 may also continue by returning to the block 705. Further in the block 755, the counter discussed with respect to the block 740 may be re-set or adjusted, e.g., after a period of time as described above.

Figure 9A:
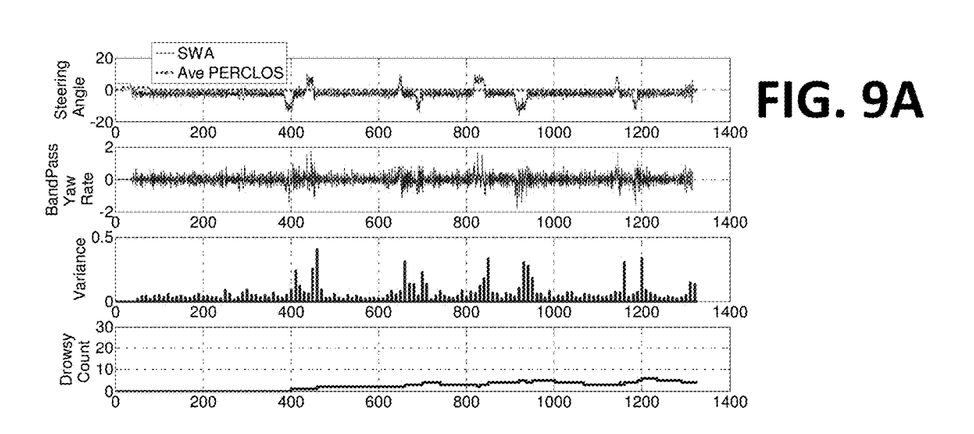
FIG. 9A illustrates data from the process of FIG. 7 related to a non-drowsy driver.
Figure 9B:
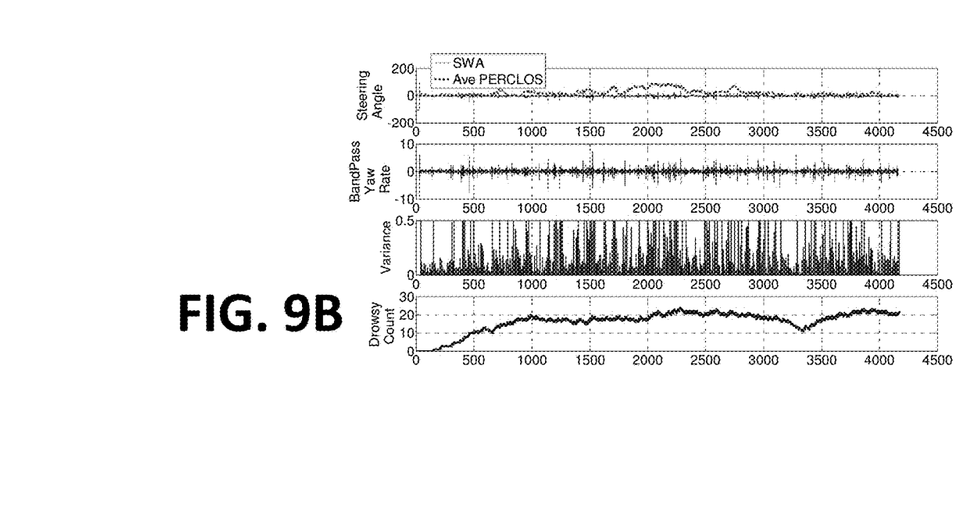
FIG. 9B illustrates data from the process of FIG. 7 related to a drowsy driver.

FIG. 9A illustrates data from the process 700 related to a non-drowsy driver. FIG. 9B illustrates data from the process 700 related to a drowsy driver. As can be seen, more significant variances are shown in FIG. 9B, leading to higher counts of possible drowsiness.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer in a vehicle, the computer comprising a processor and a memory, wherein the computer is configured to:
   collect vehicle trajectory data;
   determine a current variance of the trajectory data by using a prior variance determination of the trajectory data;
   compute a speed-dependent weighting function to obtain a speed-dependent weight;
   determine an anomaly index based at least on part on application of the speed-dependent weight to the determined current variance; and
   instruct a controller in the vehicle to take an action based on the anomaly index.

2. The system of claim 1, wherein the vehicle trajectory data is at least one of yaw-rate data and steering angle data.

3. The system of claim 1, wherein the computer is further configured to use the anomaly index to determine an anomalous driving condition.

4. The system of claim 3, wherein the computer is further configured to count a number of times that the anomaly index exceeds a predetermined threshold in determining the anomalous driving condition.

5. The system of claim 3, wherein the anomalous driving condition is a high driving demand, drowsiness, or driver impaired condition.

6. The system of claim 1, wherein the computer is further configured to apply a band-pass filter to obtain the anomaly index.

7. The system of claim 6, wherein the band-pass filter includes a step delay.

8. A method, comprising:
   collecting vehicle trajectory data;
   determining a current variance of the trajectory data by using a prior variance determination of the trajectory data;
   computing a speed-dependent weighting function to obtain a speed-dependent weight;
   determining an anomaly index based at least on part on application of the speed-dependent weight to the determined current variance; and
   instructing a vehicle controller to take an action based on the anomaly index.

9. The method of claim 8, wherein the vehicle trajectory data is at least one of yaw-rate data and steering angle data.

10. The method of claim 8, further comprising using the anomaly index to determine an anomalous driving condition.

11. The method of claim 10, further comprising counting a number of times that the anomaly index exceeds a predetermined threshold in determining the anomalous driving condition.

12. The method of claim 10, wherein the anomalous driving condition is a high driving demand, drowsiness, or driver impaired condition.

13. The method of claim 8, further comprising applying a band-pass filter to obtain the anomaly index.

14. The method of claim 13, wherein the band-pass filter includes a step delay.

15. A non-transitory computer-readable medium having instructions tangibly embodied thereon, the instructions including instructions to:
- collect vehicle trajectory data;
- determine a current variance of the trajectory data by using a prior variance determination of the trajectory data;
- compute a speed-dependent weighting function to obtain a speed-dependent weight;
- determine an anomaly index based at least on part on application of the speed-dependent weight to the determined current variance; and
- instruct a vehicle controller to take an action based on the anomaly index.

16. The medium of claim 15, wherein the vehicle trajectory data is at least one of yaw-rate data and steering angle data.

17. The medium of claim 15, the instructions further comprising instructions to use the anomaly index to determine an anomalous driving condition.

18. The medium of claim 15, wherein the computer is further configured to apply a band-pass filter that includes a step delay obtain the anomaly index.

* * * * *